United States Patent [19]
Yamada

[11] 4,416,104
[45] Nov. 22, 1983

[54] CLAMPING MECHANISM FOR IMPULSE SEALER

[75] Inventor: Teruo Yamada, Suita, Japan

[73] Assignee: Fuji Manufacturing Company Limited, Osaka, Japan

[21] Appl. No.: 304,412

[22] Filed: Sep. 21, 1981

[51] Int. Cl.³ .................... B65B 7/06; B65B 51/14
[52] U.S. Cl. ................................ 53/371; 53/373; 53/390; 83/604; 83/606; 74/516; 74/520; 219/243; 269/228; 269/239
[58] Field of Search .................... 53/371, 373, 390; 83/604, 606; 81/367, 375, 376, 377, 378, 379, 380; 74/516, 520; 100/281, 283; 219/243; 269/228, 239

[56] References Cited

U.S. PATENT DOCUMENTS

| | | | |
|---|---|---|---|
| 1,684,548 | 9/1928 | Loetscher | 269/239 X |
| 2,327,368 | 8/1943 | Olson | 269/228 X |
| 2,963,838 | 12/1960 | Harrison | 219/243 X |
| 3,106,630 | 10/1963 | Klamp | 219/243 X |
| 3,290,971 | 12/1966 | Belval | 81/367 |
| 3,480,271 | 11/1969 | Coutilish | 269/228 |
| 3,482,531 | 12/1969 | Blatt | 269/239 X |
| 3,685,250 | 8/1972 | Henry | 53/373 X |

*Primary Examiner*—John Sipos
*Attorney, Agent, or Firm*—Sughrue, Mion, Zinn, Macpeak and Seas

[57] ABSTRACT

A clamping mechanism for an impulse sealer includes a pair of drive arms pivoted on a flat base member and a pressure arm pivoted about the same pivot between the drive arms. Complimentary pressure members are located at the free ends of the drive arms and pressure arm for clamping a member to be heat sealed. A pair of levers are pivoted intermediate their ends on the drive arms between the clamping member and the pivot. The levers are comprised of two arms disposed at oblique angles relative to each other with the end of the lower arm sliding on the flat surface of the base member. The free end of the upper arm of the lever is connected to the pressure arm at a point between the clamping member and the pivot by means of a connecting rod so that depression of the drive arm will cause the ends of the lower lever arm to slide along the surface of the base member. The corresponding movement of the other lever arm will cause the pressure arm to be pivoted more rapidly than the drive arms to bring the clamping members into engagement.

7 Claims, 4 Drawing Figures

CLAMPING MECHANISM FOR IMPULSE SEALER

BACKGROUND OF THE INVENTION

The present invention is directed to a clamping mechanism for an impulse sealer and more particularly to an improved hand-operated lever system adapted to more quickly clamp the article and more efficiently exert a higher degree of pressure on the article subsequent to clamping.

Heat sealing machines currently used for forming and sealing bags of thermoplastic material are generally catagorized into two types, namely a heated element type and an impulse type. The former type employs a heat sealing method which is carried out by pressing an object to be sealed against a constantly heated element. This type is suitable for mass-production purposes involving certain materials because of the short period of heating time required thereby but is unsuitable for processing other materials which are not capable of withstanding the high temperature of the heating element such as cellophane-laminated polyethylene film. On the other hand, the latter type involves the pressing of a thermoplastic film to be sealed against a band-like electric heating wire which is protected by a layer of non-adhesive material such as a TEFLON-coated glass fiber cloth. The heating wire may be electrically heated in a very short period of time thereby allowing the use of not only ordinary thermoplastic film, but also laminated ones which may be subjected to pressures and temperatures over a wide range. As a result, this method is widely used for small or medium scale processes but requires a positive clamping of the object to be sealed. In order to obtain the force for clamping the object properly, treadle, solenoid and air cylinder means have been widely used. On the other hand, manually operated lever types have also been used to a large extent for simplifying the operation. Many of these hand operated types depend on a lever system operated by one hand so that the object to be sealed must be held in the proper position by the other hand. With such an arrangement, the clamping of the object is difficult, especially when the contents of the bag to be sealed are relatively large.

In order to overcome this problem, hand operated sealing mechanisms have been devised wherein the work table for supporting the article to be sealed is also adapted to act as the driving arm to initiate the clamping function when depressed. An example of such a conventional hand operated sealer is shown in FIG. 1, wherein the driving arm B which also supports the article to be sealed is pivotally supported at one end by a stationary fulcrum A. A sealing bar C is pivotally connected to the mid-point of the arm B by means of a pivot F. One end of the sealing bar C is connected to a suitable support through a spring S and the opposite end of the sealing bar C is provided with a clamping head H which is adapted to engage the support bed D on the arm B for clamping materials to be sealed. The sealing bar C is also connected between the spring S and the pivot F to a roller G which is rotatable about a fixed pivot so that upon lowering of the arm B, the sealing bar C will pivot downwardly to bring the clamping head H into engagement with the support bed D. In this system, assuming the distance between fulcrum A and depression point E to be ($L_1$), the distance between the fulcrum A and the pivot F to be ($L_2$), the distance between the center of the roller G and the pivot F to be ($l_1$) and the distance between the center of the roller G and the pressure head H to be ($l_2$), the force $P'$ exerted by the pressure head on the bed is related to the force P at the depression point E as ($l_1/l_2$) is related to ($L_1/L_2$) and since ($l_1$) is far smaller than ($l_2$), the total compressive force $P'$ is considerably weaker than P since $L_1$ is designed to be longer than $L_2$. Therefore, as a practial matter, it is very difficult to generate sealing pressure sufficient to obtain satisfactory sealing using a hand operated sealer of this type.

SUMMARY OF THE INVENTION

The present invention provides a new and improved clamping mechanism for an impulse sealer which is capable of imparting sufficient sealing pressure to the object to be sealed by means of a novel toggle mechanism using only a small amount of operating power.

The principal feature of the present invention lies in the conversion of the swinging or pivotal motion of the driving arm into rotating motion of an intermediate arm hingedly connected to the driving arm and reconversion of the rotating motion into the swinging or pivotal motion of the pressing arm. In other words, in the system according to the present invention, the force for depressing the driving arm (turning moment) is intensified by the lever action of the intermediate lever and the resultant intensified force is transmitted to the sealing bar whereby the pressing force will be far stronger than that in the system according to the prior art. In the prior art embodiment of FIG. 1, the turning moment of the driving arm is directly converted into that of the sealing bar only. Furthermore, in the system according to the present invention, movement of the driving arm is unsynchronous with respect to that of the sealing bar with the sealing bar moving more quickly than the driving arm in the initial stage requiring no clamping force while in the final stage, requiring clamping force, the sealing bar will move slowly at a high rate of pressure increase to impart a strong pressure to the heating bed. Therefore, a small amount of driving power is sufficient to impart a strong clamping force. The movement of the sealing bar in the aforesaid manner provides a very important advantage for facilitating the sealing effect when using an impulse sealer.

DETAILED DESCRIPTION OF THE INVENTION

Figure 1:
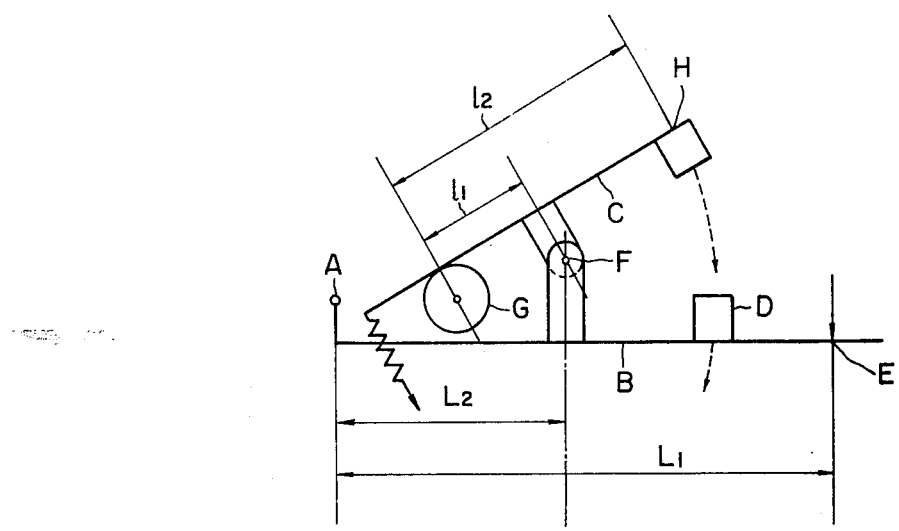
FIG. 1 is a schematic side view illustrating the driving mechanism of a prior art work table driven impulse sealer.
Figure 3:
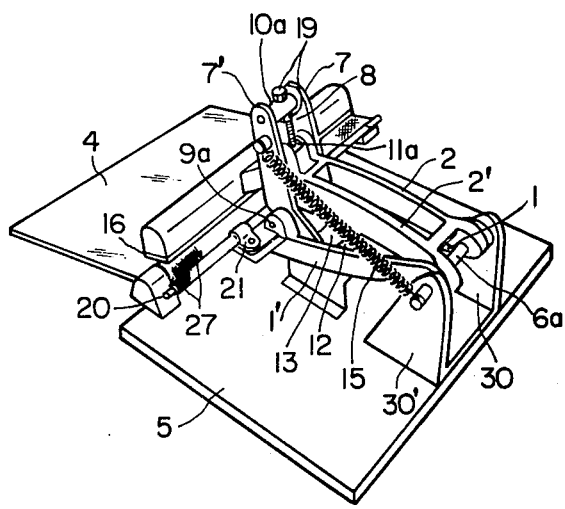
FIG. 3 is a perspective view of a sealing machine according to the present invention.
Figure 2:
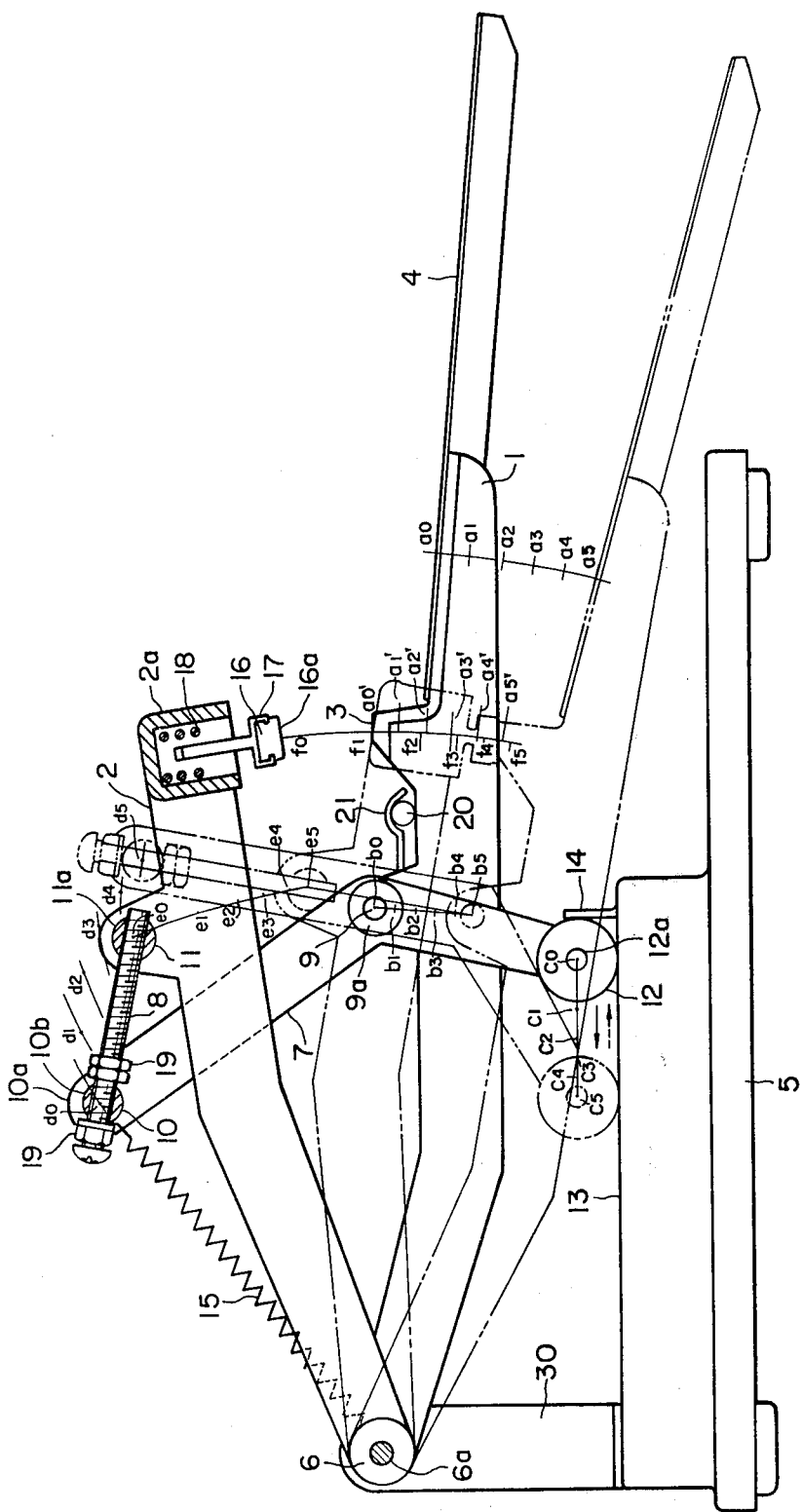
FIG. 2 is a schematic side elevation view, partly in section, showing the driving arrangement for a work table driven impulse sealer according to the present invention.
Figure 4:
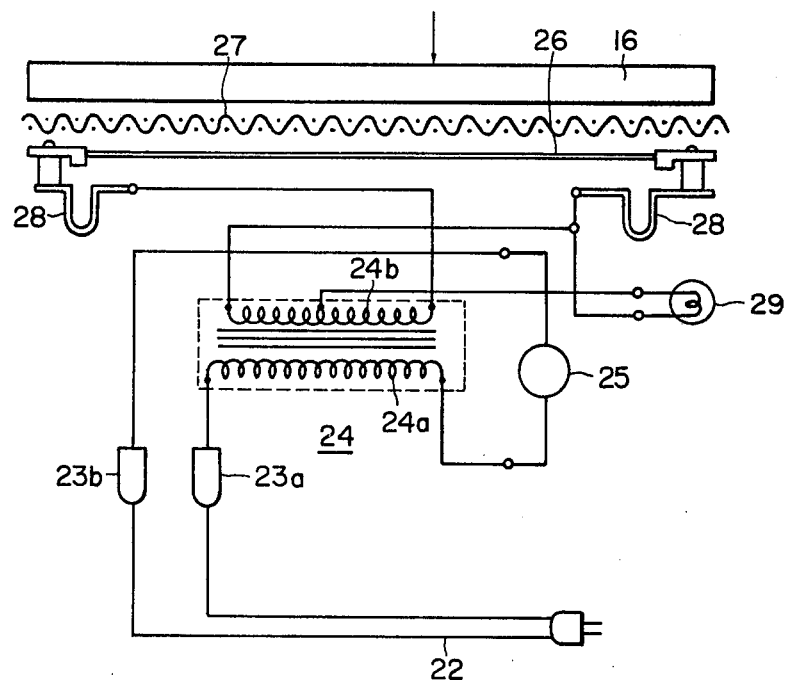
FIG. 4 is a circuit diagram for the machine shown in FIG. 3.

According to the present invention as illustrated in FIGS. 2, 3 and 4, a first pair of driving arms 1,1' are pivoted by means of a pivot pin 6 on a pair of support plates 30 which in turn are secured to a base plate 5. A work support plate 4 is secured to the outermost ends of the driving arms 1,1' and a sealing bed 3 extends transversely of the driving arms 1,1' along one edge of the work support plate 4. A pair of sealing bars 2,2' are also pivotally connected on the pivot pin 6 intermediate the two driving arms 1,1'. A sealing head 2a is connected to and extends transversely of the sealing bars substantially the entire length of the bed 3. An elongated rubber pressure member 16 is carried by a holder 17 which is supported in the pressure head 2a by means of a spring 18 which is adapted to control excessive pressure application as well as to accommodate different thicknesses of the film to be sealed. The rubber pressure member 16 extends substantially the entire length of the pressure head 2a.

A pair of intermediate levers 7,7' are pivotally connected to the driving arms 1,1', respectively, by means of pivot pins 9 located between the pivot pin 6 and the bed 3. The levers 7,7' have a boomerang shape with the pivot pin 9 being located at the bend of each lever. The outermost ends of the levers 7,7' are interconnected by means of a rod 10 having a hole 10b extending therethrough. A connecting rod 8 is comprised of a threaded bolt extending through the bore 10b and secured therein by means of nuts 19 threaded onto the bolt on opposite sides of the rod 10. The other end of the connecting rod 8 is secured to a rod 11 extending between and interconnecting the two sealing bars 2,2'. A roller 12 is rotatably mounted between the two levers 7,7' on a pin 12a and is adapted to roll on the surface 13 and the movement along the surface 13 is limited in one direction by means of a stop plate 14. A spring 15 extends between the pivot pin 6 and the rod 10 for normally biasing the levers 7,7' in a counterclockwise direction about the pivot pins 9. A rod 20 for supporting the TEFLON-coated fiberglass cloth 27 which extends over the bed 3, is secured to the upper surface of the driving arms 1,1' by means of clamps 21.

When the driving arms 1,1' are depressed in a downward direction towards the base plate 5 against the force of the return spring 15, the roller 12 will be displaced in the direction of the solid arrow in FIG. 2 along the surface 13. This in turn, displaces the levers 7,7' so that they rotate about the pivot pins 9 in a clockwise direction and exert a downward force on the sealing bars 2,2' through the connecting rod 8. Thus, the driving arms 1, 1', the sealing bars 2,2' and the intermediate levers 7,7' will move from the solid line positions as shown in FIG. 2 to the chain line positions to clamp an object to be sealed (not shown) between the rubber pressure piece 16 and the bed 3.

In analyzing the movements of the various parts, the angle of movement defined by the driving arms 1,1' as they are displaced from the initial position ($a_0$) to the final sealing position ($a_5$) on the work table, is divided into five parts, the points of division being marked as $a_1 \ldots a_4$ in turn. The points of displacement of the bed 3, the pivot pins 9, the pin 12a for the roller 12, the connecting rod 10, the connecting rod 11 and the lower surface 16a of the pressure piece 16 are marked as $a'_0 \ldots a'_5, b_0 \ldots b_5, c_0 \ldots c_5, d_0 \ldots d_5, e_0 \ldots e_5$, and $f_0 \ldots f_5$, respectively, corresponding to the points $a_0 \ldots a_5$ as shown in the drawing. In short, while the driving arms 1,1' move to the position $a_1$, the lower surface 16a of the pressure piece descends a distance from $f_0$ to $f_1$ whereas the upper surface of the bed 3 moves only a shorter distance from $a'_0$ to $a'_1$ in proportion to the moving distance of the work support plate 4. That is, the descent of the sealing bar is faster than that of the bed and when the depression point reaches the position $a_3$, the lower surface of the pressure piece 16 will come into contact with the upper surface of the bed 3. Subsequently, the moving force of the driving arms will be amplified to increase the pressure of the sealing bar on the bed without variation so that a far stronger force will be exerted upon the sealing position as compared to the force of depression applied to the work support plate 4. When the force applied to the work support plate 4 is removed, the driving arms and the sealing bars will return to the initial positions under the force of the return spring 15 while the pressure of the sealing head to the sealing bed is gradually reduced at first, and then more rapidly to provide more favorable sealing conditions.

In the foregoing structure, the boomerang shape levers 7,7' perform the most important function. These levers are to transmit the power to the sealing bars 2,2' through the connecting rod 8 pivotally connected thereto. In view of the theoretical relation with the vector force, the maximum pressing force acts upon the sealing bars 2,2' when the levers 7,7' and the rod 8 are lined up so that the longitudinal axes thereof are in the same plane perpendicular to the sealing bars 2,2'. Therefore, it is desirable to design the length of all arms and bars, the distances between various pivot support points and the degree of bend in the boomerang shaped levers so that the levers 7,7' and the rod 8 are lined up in the same plane perpendicular to the sealing bars 2,2' as shown in the drawing when the pressure piece 16 overlies the sealing bed 3. In the embodiment shown in the drawing, the connecting rod 8 is so designed so that the length thereof is adjustable relative to the connecting member 11.

According to the present construction, a force-multiplication theory provides a capability of applying a remarkably high pressure to the sealing bed. However, since the sealing operation does not require excessively high pressure, the holder 17 for the pressure piece 16 is spring supported within the pressure head 2a so as to control the excess of pressure application as well as to accommodate variations in the thickness of the film to be sealed. Accordingly, the pressure acting on the sealing bed 3 functions in relation to the compression of the spring 18 after the lower surface 16a of the pressure piece 16 reaches the position $f_3$. That is, in this case, since the intensity of the force acting on the object to be sealed is equal to that of the resistance of the spring. The selection of an appropriate spring force enables the setting of an appropriate degree of pressure relative to the object to be sealed.

When the above-described apparatus is used in combination with an impulse sealer, a heating element is provided which extends the length of the bed 3. FIG. 4 is a schematic circuit diagram of an impulse sealer suitable for use with the apparatus according to the present invention. The AC current from the power source 22 is supplied to the primary coil 24a of the transformer 24 through terminals 23a and 23b. This circuit is provided with a timer switch 25 which is adapted to be closed upon depression of the driving arms 1,1' by any suitable means and opened after the lapse of a predetermined adjustable time period. One end of the secondary coil 24b of the transformer 24 is connected to a heater element 27, the other end of which is grounded. The other end of the secondary coil 24b is also grounded and a lead wire branching off from the coil at the midportion thereof is also connected to ground through a pilot lamp 29. In practice, the upper portion of the heater element 26 is covered with a TEFLON-coated glass fiber cloth 27 and the portion of the plastic bag to be sealed is clamped between the cloth 27 and a silicon rubber pressure piece 16. The pilot lamp 29 is turned on with the closing action of the timer switch 25 and is turned off with the opening of the timer to inform the operator that the sealing operating is completed. The operator therefore, only has to place an object to be sealed on the work support plate 4, depress the plate while holding the workpiece in the proper position, remove his hands from the plate when the pilot lamp is turned off and remove the sealed object. Thus, it is possible to accurately position and hold the workpiece relative to the sealing element and still manipulate the clamping mechanism in a simple, forceful manner. While the clamping mechanism as described in the present application is hand operated and particularly suitable for a small bench-type sealer, it is obvious that the clamping mechanism is also readily adaptable to operation by a treadle, solenoid or air cylinder. Likewise, the pivotal arrangement of the various arms, bars and levers of the clamping mechanism are also particularly adaptable for use with a head adapted to carry out a punching, cutting, pressing or shearing operation requiring the multiplication of input force.

While the invention has been particularly shown and described with reference to a preferred embodiment thereof, it will be understood by those in the art that various changes in form and detail may be made therein without departing from the spirit and scope of the invention.

What is claimed is:

1. A work clamping mechanism comprising a base member having first pivot means thereon, a pair of spaced apart parallel drive arms pivoted at one end on said first pivot means, work support means secured to the opposite ends of said drive arms, pressure bar means pivotally mounted at one end on said pivot means between said drive arms and having clamping means secured to the opposite end thereof, second pivot means on each of said drive arms intermediate the ends thereof, a pair of lever arms pivoted at their mid-points on said second pivot means with one end of each lever slidably engaging said base member and connecting means pivotally connected to the opposite ends of said lever arms and pivotally connected to said pressure bar means between the ends thereof so that upon pivoting of said drive arms by the work support means said pressure bar means is pivoted through said lever arms and connecting means to clamp the work between said clamping means and said work support means.

2. A clamping mechanism as set forth in claim 1, wherein the ends of each of said lever arms are disposed at an oblique angle relative to each other with the pivotal connection to said drive arms being at the apex of said angle whereby said ends of said lever arms slidably engage said base member along a path located between said first and second pivot means.

3. A clamping mechanism as set forth in claim 1, wherein said connecting means is comprised of a rod adjustably connected to pin means rotatably mounted on said lever arms and said pressure bar means whereby pivotal movement of said lever arms about said second pivot means will pivot said pressure bar means towards said drive arms to bring said clamping means into engagement with said work support means.

4. A clamping mechanism as set forth in claim 3, further comprising spring means extending between said first pivot means and the opposite ends of said lever arms for separating said clamping means from said work support means.

5. A clamping mechanism as set forth in claim 1, wherein said work support means is comprised of an elongated support bed extending transversely of said drive arms at a point spaced inwardly from the ends thereof and plate means secured to the outermost ends of said arms.

6. A clamping mechanism as set forth in claim 5, wherein said clamping means is comprised of an elongated pressure member having a length commensurate with said support bed and means for resiliently supporting said pressure member transversely of said pressure bar means for resilient engagement with said supporting bed.

7. A clamping mechanism as set forth in claim 1, further comprising stop means on said base member for limiting the sliding movement of said lever arms on said base member in a direction away from said first pivot means.

* * * * *